(12) United States Patent
Berner et al.

(10) Patent No.: US 11,820,628 B2
(45) Date of Patent: Nov. 21, 2023

(54) ELEVATOR SYSTEM COMPRISING DEFLECTING ELEMENTS HAVING DIFFERENT GROOVE GEOMETRIES

(71) Applicant: Inventio AG, Hergiswil (CH)

(72) Inventors: Oliver Berner, Sursee (CH); Florian Dold, Bremgarten (CH)

(73) Assignee: INVENTIO AG, Hergiswil (CH)

( * ) Notice: Subject to any disclaimer, the term of this patent is extended or adjusted under 35 U.S.C. 154(b) by 842 days.

(21) Appl. No.: 16/650,029

(22) PCT Filed: Oct. 5, 2018

(86) PCT No.: PCT/EP2018/077195
§ 371 (c)(1),
(2) Date: Mar. 24, 2020

(87) PCT Pub. No.: WO2019/076655
PCT Pub. Date: Apr. 25, 2019

(65) Prior Publication Data
US 2020/0277165 A1  Sep. 3, 2020

(30) Foreign Application Priority Data

Oct. 17, 2017 (EP) ..................... 17196734

(51) Int. Cl.
| | |
|---|---|
| *B66B 15/02* | (2006.01) |
| *B66B 7/06* | (2006.01) |
| *B66B 15/04* | (2006.01) |
| *F16G 9/00* | (2006.01) |
| *F16H 55/38* | (2006.01) |
| *F16H 55/49* | (2006.01) |

(52) U.S. Cl.
CPC .............. *B66B 15/02* (2013.01); *B66B 7/062* (2013.01); *B66B 15/04* (2013.01); *F16G 9/00* (2013.01); *F16H 55/38* (2013.01); *F16H 55/49* (2013.01)

(58) Field of Classification Search
CPC ......... B66B 15/02; B66B 7/062; B66B 15/04; F16G 9/00; F16H 55/38; F16H 55/49
See application file for complete search history.

(56) References Cited

U.S. PATENT DOCUMENTS

| | | | | |
|---|---|---|---|---|
| 4,030,569 A | * | 6/1977 | Berkovitz | ............... F16H 55/36 254/390 |
| 5,792,294 A | * | 8/1998 | Randazzo | ............... B29C 73/04 254/390 |

(Continued)

FOREIGN PATENT DOCUMENTS

| | | |
|---|---|---|
| CN | 1294271 A | 10/2000 |
| CN | 1623884 A | 6/2005 |

(Continued)

*Primary Examiner* — Michael A Riegelman
(74) *Attorney, Agent, or Firm* — William J. Clemens; Shumaker, Loop & Kendrick, LLP

(57) ABSTRACT

An elevator system includes a car and/or a counterweight connected to a belt having a plurality of ribs. The elevator system further has at least two deflecting elements over which the belt is guided and which each have a plurality of grooves. The grooves of at least one of the deflecting elements are configured with geometries that differ from the grooves of another of the deflecting elements. The belt has longitudinal ribs that cooperate with the grooves.

9 Claims, 4 Drawing Sheets

(56) References Cited

U.S. PATENT DOCUMENTS

| | | | | |
|---|---|---|---|---|
| 6,371,448 B1* | 4/2002 | De Angelis | ............. | F16H 55/50 |
| | | | | 474/169 |
| 7,040,456 B2* | 5/2006 | Ach | ........................ | B66B 7/062 |
| | | | | 474/263 |
| 7,882,935 B2* | 2/2011 | Ach | ........................ | F16G 5/20 |
| | | | | 474/261 |
| 8,348,019 B2* | 1/2013 | Blochle | .................. | B66B 15/04 |
| | | | | 474/190 |
| 8,449,349 B2* | 5/2013 | Thompson | ............. | D07B 5/006 |
| | | | | 451/28 |
| 9,695,014 B2* | 7/2017 | Begle | ...................... | B66B 7/062 |
| 10,766,746 B2* | 9/2020 | Hubbard | ............... | B66B 15/04 |
| 11,585,390 B2* | 2/2023 | Cariccia | ................... | F16D 3/12 |
| 2003/0192743 A1* | 10/2003 | Aulanko | .................. | B66B 7/06 |
| | | | | 187/254 |
| 2007/0017749 A1* | 1/2007 | Dold | ....................... | B66B 7/085 |
| | | | | 187/251 |
| 2008/0087500 A1* | 4/2008 | Ach | ........................ | B66B 7/062 |
| | | | | 187/255 |
| 2010/0243378 A1* | 9/2010 | Begle | ...................... | B66B 11/08 |
| | | | | 187/254 |
| 2012/0211310 A1* | 8/2012 | Peric | ....................... | B66B 7/062 |
| | | | | 187/254 |
| 2015/0024891 A1* | 1/2015 | Allwardt | ................ | D07B 1/145 |
| | | | | 474/204 |
| 2018/0162699 A1* | 6/2018 | Cambruzzi | ............. | B66B 15/02 |
| 2020/0277165 A1* | 9/2020 | Berner | ...................... | F16G 9/00 |
| 2022/0219944 A1* | 7/2022 | Dold | ....................... | B66B 15/02 |

FOREIGN PATENT DOCUMENTS

| | | |
|---|---|---|
| CN | 102209679 A | 10/2011 |
| EP | 1096176 A1 | 5/2001 |
| EP | 1396458 A2 | 3/2004 |
| EP | 1535875 A1 | 6/2005 |
| EP | 1834919 A2 | 9/2007 |
| EP | 1886796 A1 | 2/2008 |
| EP | 1886958 A1 | 2/2008 |
| EP | 1535875 B1 | 2/2013 |
| WO | 2010072690 A1 | 7/2010 |

* cited by examiner

ELEVATOR SYSTEM COMPRISING DEFLECTING ELEMENTS HAVING DIFFERENT GROOVE GEOMETRIES

FIELD

The invention relates to an elevator system, comprising a car and/or a counterweight and a belt for supporting the car or the counterweight. The belt has a plurality of tension-bearing elements extending in the longitudinal direction of the belt, and a sheath, in which the tension-bearing elements are embedded. The belt further has a first side and a second side opposite the first side, wherein at least the first side has a plurality of ribs running in the longitudinal direction of the belt. The elevator system further has a first and a second deflecting element, over which the belt is guided. Both deflecting elements each have a plurality of grooves, with which the ribs of the belt mesh. The invention further relates to a belt for supporting a car and/or a counterweight of an elevator system.

BACKGROUND

In elevator systems, belts instead of steel cables are increasingly used for supporting the car and the counterweight, which, for moving the car and the counterweight, are guided and thus driven over a traction sheave of a motor. Furthermore, the belts are guided in the elevator system via a multiplicity of other deflecting elements, particularly rollers, for example, rollers which are fastened to the car or the counterweight.

For driving the belt over the traction sheave, it is necessary that there is sufficient traction between the belt and the traction sheave. In turn, said traction depends significantly on two factors, namely on the interaction of the geometries of the grooves of the traction sheave and the ribs of the belt, and on the coefficient of friction between the belt material and the material of the traction sheave.

However, if the belts are loaded with a diagonal pull, ascent forces are generated between the belts and the deflecting elements, which may cause the belts to rise within the grooves of the deflecting elements and, in the extreme case, may cause the belts to jump out of the rollers, resulting in a so-called belt jump, which leads to a deterioration of the running properties of the belts on the deflecting elements. In turn, these ascent forces also depend on the geometry of the ribs of the belt, the geometry of the grooves of the deflecting elements, and on the coefficient of friction between the belt material and the material of the deflecting elements.

In known elevator systems, grooves of the same geometry are provided on the running surfaces of all deflecting elements, i.e., particularly of the traction sheave and the other rollers, and so a compromise must always be struck between a sufficient traction and a belt jump risk that is not too great. This has the disadvantage that either only a low traction can be transmitted or the belt jump risk is relatively high. In addition, it is disadvantageous that those groove geometries required for a sufficient traction often cause a relatively high wear on the belt due to high local forces.

A belt for elevator systems is known, for example, from US2015/024891 and EP1886958. From EP1396458, an elevator system with belts is known, which are equipped with different grooves on the two sides and thus run over differently designed deflecting elements.

SUMMARY

The invention addresses the problem of providing an elevator system and a belt for elevator systems, in which a sufficient traction for moving the cabin and the counterweight can be transmitted but with a simultaneous low wear of the belt and a low belt jump risk.

According to the invention, the grooves of the first deflecting element have a first geometry and the grooves of the second deflecting element have a second geometry different from the first geometry. This ensures that there are different power transmission options between the two deflecting elements and the one running side of the belt which is provided with ribs. At a constant rib geometry of the belt, a high traction force, for example, can thus be transmitted at one deflecting element, while the geometry at the other deflecting element is designed such that there is only a small belt jump risk.

Particularly for the first deflecting element, the first geometry of the grooves is selected such that, in the case of transverse traction, the lowest possible ascent forces are generated and the risk of a belt jump is thus low.

However, in the case of the second deflecting element, the second geometry of the grooves is selected particularly such that there is a high degree of traction between the belt and the second deflecting element, and so great forces can be transmitted and the belt can thus be driven.

The tension-bearing elements are arranged particularly entirely outside the ribs. The ribs are particularly formed exclusively of the same material as, of which the sheath is made. This is particularly a polymer, for example, PU or EPDM.

The geometry of a groove refers particularly to its profile in cross-section.

The first deflecting element as well as the second deflecting element can each be particularly a roller or a disc.

In a particularly preferred embodiment, the first deflecting element is a roller, wherein the second deflecting element in this embodiment is a traction sheave of a motor for moving the car and/or the counterweight. In this case, the geometry of the grooves of the traction sheave is designed such that a large traction force can be transmitted, whereas the grooves of the first deflecting element, i.e., the roller, are designed such that in case of a transverse traction of the belt, only low ascent forces are generated. As a result, only at the point, at which a high traction is needed, i.e., at the traction sheave, this high traction is actually achieved with the disadvantage of high wear of the belt and the high belt jump risk, whereas in the case of all other deflecting elements, there is a low-wear running of the belt with low belt jump risk. Overall, the belt wear and the belt jump risk are thus considerably reduced when compared to elevator systems, in which all deflecting elements would have the belt geometry of the traction sheave.

The first and second geometry are preferably designed such that the traction between the second deflecting element and the belt is greater than between the first deflecting element and the belt.

In a particularly preferred embodiment of the invention, the grooves of the second deflecting element each have an undercut, whereas the grooves of the first deflecting element are designed in an undercut-free manner. An undercut-free design refers to the fact that the grooves have no undercut.

The geometries of the second and the first deflecting element are particularly designed such that, with the exception of the undercut, they are shaped identically.

With the exception of the undercut, the geometries of the grooves of the two deflecting elements are preferably designed to be complementary to the geometry of the ribs of the belt.

The undercut in the grooves creates a local normal force increase which in turn opens the possibility for transmitting a higher friction force, especially in the case of semicircular, elliptical, or arc-shaped ribs of a belt.

The local normal force increase results in an increase in pressing, which leads to greater damage to the belt material when the belt runs through the grooves with the undercut.

By using undercuts only in those deflecting elements that actually have to transmit a high traction force, the damage to the belt is minimized overall. Furthermore, the belt jump risk is reduced.

In the elevator system, particularly only the traction sheave has the second geometry, whereas all other deflecting elements have grooves with the first geometry.

Furthermore, due to the undercuts, a sufficient traction between the tension-bearing elements and the pulley is achieved in order to prevent an unwanted movement of the elevator car even if the sheath of the belt is lost.

In a preferred embodiment of the invention, the grooves of the second deflecting element have at least to some extent a coating or a tissue that increases the friction coefficient. This in turn ensures that a correspondingly high friction force can be transmitted between those deflecting elements, for which high traction is required, whereas in the other deflecting elements, there is a lower traction capacity and thus also a lower belt jump risk.

It is particularly advantageous if the cross-section of the ribs of the belt is each arch-shaped, circle-segment-shaped, semicircular, or ellipse segment-shaped. Correspondingly, the geometries of the ribs of the first and/or second deflecting element, which are designed to be complementary thereto, are, apart from possible undercuts, also arch-shaped, circle-segment-shaped, semicircular, or ellipse segment-shaped.

In a particularly preferred embodiment of the invention, the cross-section of the ribs is selected such that it results in an arch-shaped contour. This arch-shaped contour is advantageous because the angle relative to the plane of the central axis becomes continuously smaller with increasing distance, thus causing a self-locking effect when the belt ascends in the grooves, and a danger of seizure of the ribs in the grooves of the deflecting elements, which is present in the case of V-shaped ribs with steep angles, is prevented by the arch-shaped geometry. Furthermore, a high traction in the running direction at a simultaneously low ascent susceptibility in case of a diagonal pull can be achieved by the corresponding shaping with an arch-shaped contour.

In a particularly preferred embodiment, circle-segment-shaped, particularly semicircular, ribs are used which also have a corresponding self-locking effect due to the changing angle and a low tendency to seize. Alternatively, ellipse-shaped ribs can also be used. Alternatively, it is also possible that circle-segment-shaped or semicircular ribs with a flattened upper side are used, i.e., the tips of the ribs have a particularly planar surface which runs preferably parallel to the plane of the central axes of the tension-bearing elements.

A further aspect of the invention relates to a belt for supporting a car and/or a counterweight of an elevator system, wherein the belt has a plurality of tension-bearing elements running in the longitudinal direction of the belt, and a sheath in which the tension-bearing elements are embedded. The belt has a first side and a second side opposite the first side, wherein the first side and the second side have an equal number of ribs running in the longitudinal direction of the belt. In this case, the ribs of the first side and the ribs of the second side have a different geometry. The geometries of the ribs of the first and the second side are particularly selected such that, when the ribs of the second side mesh with grooves of a deflecting element, a higher traction is present than when the ribs of the first side of the belt mesh with an identically designed deflecting element.

Providing differently formed ribs on the two sides of the belt in turn ensures that, depending on which side is in mesh with a deflecting element, different running properties of the belt, particularly different force transmission properties, can be achieved even with similarly designed deflecting elements, i.e., particularly with deflecting elements with the same groove geometry.

In turn, a high traction force can thus be transmitted via a meshing of the second side with a deflecting element, whereas only small force transmissions and thus minor damage to the belt are generated via the meshing of the first side with a deflecting element. Furthermore, the belt jump risk is reduced.

A further aspect of the invention relates to an elevator system, comprising a car and/or a counterweight and a belt as described above. The elevator system further comprises a first deflecting element, over which the belt is guided, and a second deflecting element, over which the belt is also guided. Both the first and the second element each have a plurality of grooves, wherein the belt with the ribs of the first side meshes with the grooves of the first deflecting element, and with the ribs of the second side, it meshes with the grooves of the second deflecting element.

The grooves of the first and the second deflecting element are shaped particularly identically. Preferably, the grooves of all deflecting elements of the elevator system are identically shaped.

The first deflecting element is particularly a roller and the second deflecting element is a traction sheave of a motor for moving the car and/or the counterweight of the elevator system. The different geometries ensure that a large force can be transmitted at the traction sheave via the contact with one side, but the contact between the belt and the deflecting element via the other side of the belt results in only slight wear of the belt and the belt jump risk is reduced.

Furthermore, the elevator system can also be developed with the features described in connection with the elevator system of the first aspect of the invention. Preferably, the belt of this elevator system can particularly also be developed with the features described for the belt of the elevator system according to the first aspect of the invention.

Additional features and advantages of the invention are provided in the following description, which explains the invention in more detail using embodiments in conjunction with the attached drawings.

DETAILED DESCRIPTION

Figure 1:
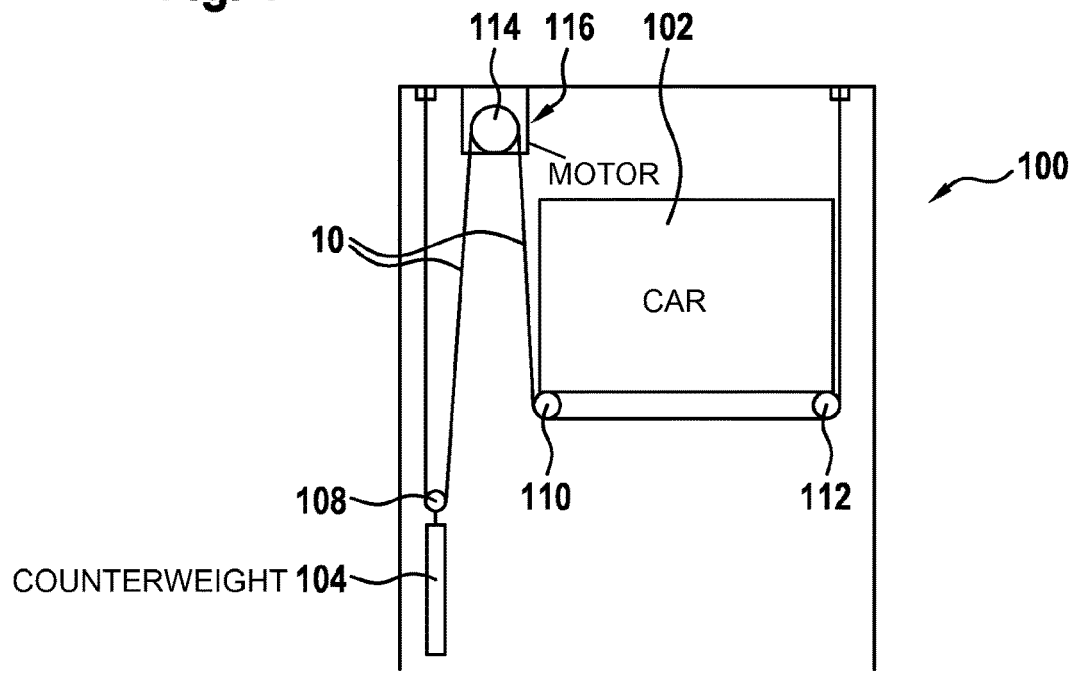
FIG. 1 a schematic, highly simplified depiction of an elevator system.

FIG. 1 shows a schematic, highly simplified depiction of an elevator system 100. The elevator system 100 has an elevator car 102 and a counterweight 104, which are supported by a belt 10. In this case, the belt 10 is guided over a plurality of deflecting elements. There are two types of deflecting elements. On the one hand, they are rollers 108, 110, and 112, over which the belt is guided. On the other hand, the belt 10 is guided over a traction sheave 114 of a motor 116, over which the belt 10 can be moved in its longitudinal direction. As a result, the position of the elevator car 102 and the counterweight 104 within the elevator shaft of the elevator system 100 can be changed. In order to ensure that the belt can be guided over all deflecting elements with the one running side, the belt is subject to half a longitudinal rotation by 180° between two deflecting elements deflecting in the opposite direction. In the drawing, such a twist occurs between the roller 108 and the traction sheave 114, as well as between the traction sheave 114 and the roller 110.

Figure 2:
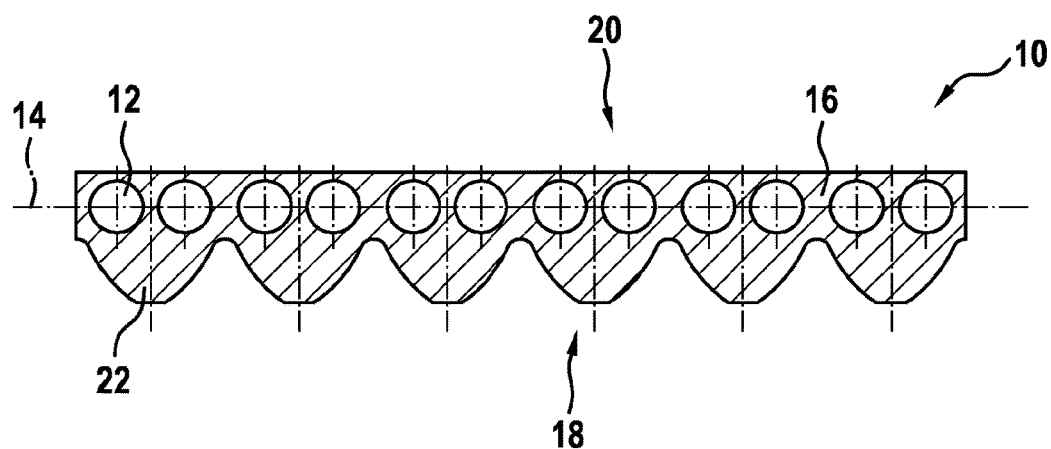
FIG. 2 a sectional view of a belt according to a first embodiment.

FIG. 2 shows a sectional view of the belt 10 of the elevator system 100 according to FIG. 1.

The belt 10 has a plurality of tension-bearing elements 12 running in the longitudinal direction of the belt 10, and their longitudinal axes lie in a common center plane 14.

The tension-bearing elements 12 are particularly cables, preferably steel cables. Alternatively, they can also be fiber ropes.

The tension-bearing elements 12 are embedded in a sheath 16 which completely surrounds the tension-bearing elements 12 and which particularly comprises a polymer.

The belt 10 has a first side 18 and a second side 20 opposite the first side, wherein, on the first side 18, a plurality of ribs 22 is provided, whose geometry is formed such that, in the profile, they have a semicircular cross-section with a flattened tip.

Figure 3:
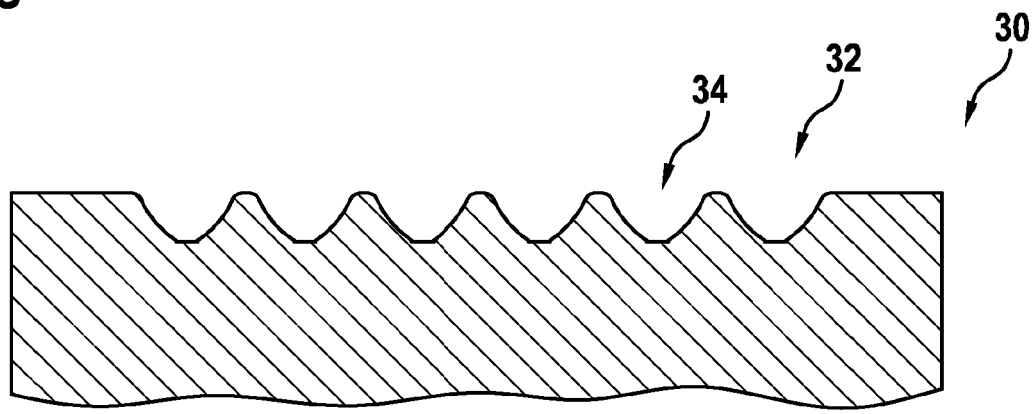
FIG. 3 a section of a first deflecting element of the elevator system according to FIG. 1.

FIG. 3 shows a section of a first deflecting element 30, the running surface 32 of which has a plurality of grooves 34. Once again, these grooves 34 have a first geometry, which is also semi-segment-shaped with flattened bottoms and thus designed to be complementary to the geometry of the ribs 22 of the belt 10.

The groove geometry shown in FIG. 3 is used particularly for all rollers 108 to 112 of the elevator system 100, at which no traction force has to be transmitted, i.e., particularly for all rollers 108 to 112 with the exception of the traction sheave 114.

Figure 4:
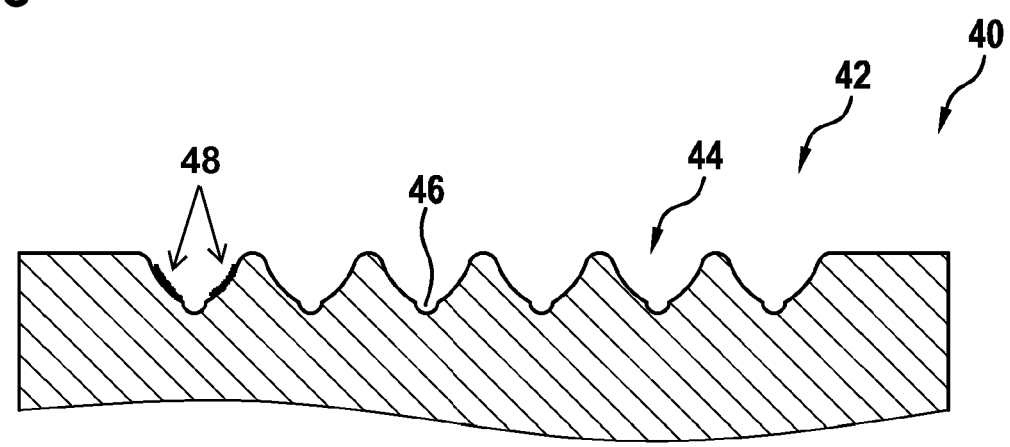
FIG. 4 a section of a second deflecting element of the elevator system according to FIG. 1.

FIG. 4 shows a section of a second deflecting element 40, which also has a plurality of grooves 44 on its running surface 42, which have a second geometry deviating from the first geometry of the grooves 34 of the first deflecting element 30. This second geometry is particularly designed such that the profile of the grooves 44 is also semicircular, but on the bottom side, an undercut 46 is provided in each case. Particularly the first and the second geometry are thus designed largely identical with the exception of said undercuts 46.

Said second geometry, which is shown in FIG. 4, is particularly the geometry of the grooves, which is used in the traction sheave 114.

The undercuts achieve a local normal force increase, thereby increasing the traction capacity, and so great forces can be transmitted from the traction sheave to the belts, which are necessary for moving the car 102 and the counterweight 104. The grooves 44 of the second deflecting element 40 have at least to some extent a coating 48 or a tissue 48 that increases the friction coefficient.

On the other hand, the first geometry of the first deflecting element 30, i.e., particularly all rollers 108 to 112 with the exception of the traction sheaves 114, is advantageous because the belt 10 is less damaged by this geometry and the risk of a belt jump in the event of transverse traction to the belt 10 is reduced.

Figure 5:
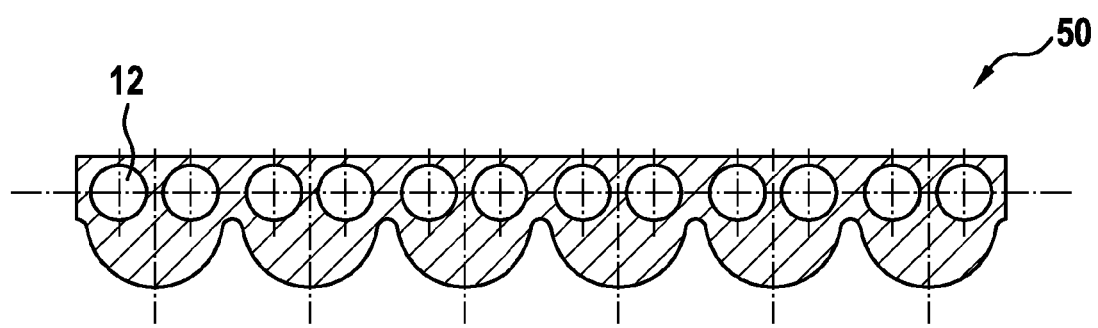
FIG. 5 a sectional view of a belt according to a second embodiment.

FIG. 5 shows a sectional view of a belt 50 according to a second embodiment. Unlike the belt according to the first embodiment according to FIG. 2, the semicircular ribs have no flattening at their tips.

Figure 6:
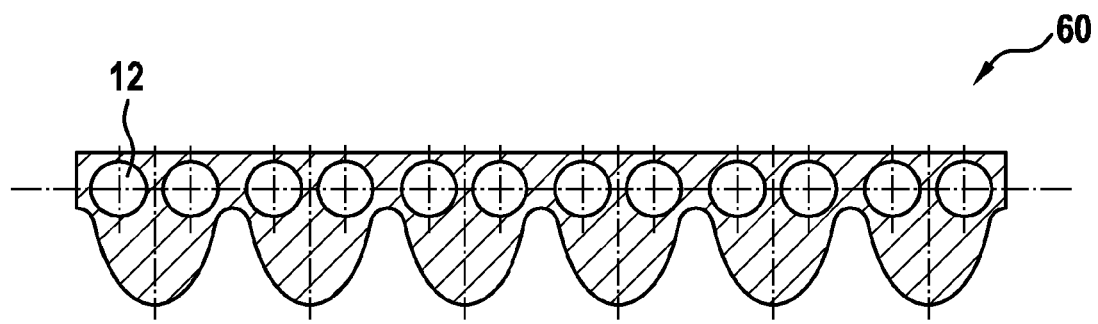
FIG. 6 a sectional view of a belt according to a third embodiment.

FIG. 6 shows a sectional view of a belt 60 according to a third embodiment, wherein ellipse segment-shaped ribs are provided instead of semicircular ribs.

In particular, the geometries of the grooves 34, 44 of the deflecting elements 30, 40 are once again designed to be essentially complementary to the geometry of the ribs of the belts 50 and 60, with the exception that the second deflecting element 40 is again provided with undercuts 46.

Figure 7:
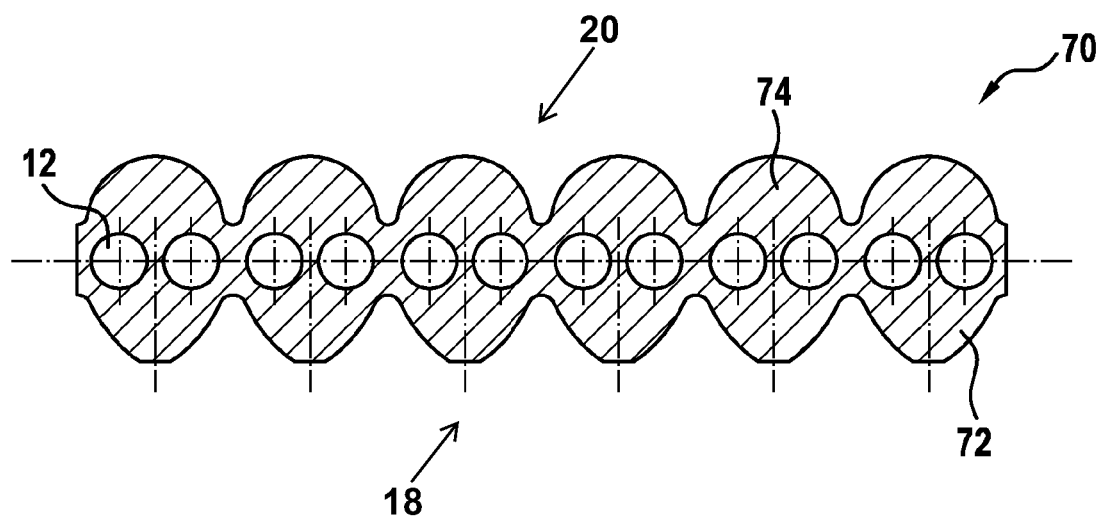
FIG. 7 a sectional view of a belt according to a fourth embodiment.

FIG. 7 shows a sectional view of a belt 70 according to a fourth embodiment. In the belt 70, an equal number of ribs 72 and 74 are provided both on the first side 18 and on the second side 20, wherein the geometries of the ribs 72, 74, however, differ from one another on the two sides 18, 20. This ensures that, depending on which side 18, 20 and thus which rib geometry is in contact with the grooves of a deflecting element, different force transmission properties are achieved. With this belt, the twist between two opposingly deflecting ones of the deflecting elements can be foregone.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 10, 50, 60, 70 Belts
12 Tension-bearing elements
14 Center plane
16 Sheath
18, 20 Side
22, 72, 74 Rib
30, 40 Deflecting element
32, 42 Running surface
34, 44 Groove
46 Undercut
48 Coating or tissue
100 Elevator system
102 Car
104 Counterweight
108, 110, 112 Roller
114 Traction sheave
116 Motor

The invention claimed is:

1. An elevator system including a car and/or a counterweight, a belt supporting the car and/or the counterweight, a first deflecting element over which the belt is guided, and a second deflecting element over which the belt is guided, comprising:

the belt includes a plurality of tension-bearing elements running in a longitudinal direction of the belt and a sheath in which the tension-bearing elements are embedded;

the belt has a first side and a second side opposite the first side, wherein the belt is guided with the first side over both the first deflecting element and the second deflecting element;

at least the first side of the belt has a plurality of ribs running in the longitudinal direction of the belt;

each of the first and second deflecting elements has a plurality of grooves with which the ribs of the first side of the belt mesh; and wherein the grooves of the first deflecting element have a first geometry in cross-section, and the grooves of the second deflecting element have a second geometry in cross-section different from the first geometry, the cross-sections being transverse to the longitudinal direction of the belt when the ribs are meshed with the grooves.

2. The elevator system according to claim 1 wherein the first deflecting element is a roller or a disc.

3. The elevator system according to claim 1 wherein the second deflecting element is a roller or a disc.

4. The elevator system according to claim 1 wherein the first deflecting element is a roller and the second deflecting element is a traction sheave of a motor for moving the car and/or the counterweight.

5. The elevator system according to claim 1 wherein the first geometry and the second geometry are configured such that a traction between the second deflecting element and the belt is greater than a traction between the first deflecting element and the belt.

6. The elevator system according to claim 1 wherein the grooves of the second deflecting element each have an undercut formed therein, and the grooves of the first deflecting element are configured without an undercut.

7. The elevator system according to claim 1 wherein the grooves of the second deflecting element include a coating or a tissue that increases a friction coefficient of the second deflecting element.

8. The elevator system according to claim 1 wherein a cross-section of each of the ribs of the belt is arch-shaped, circle-segment-shaped, semicircular, or ellipse segment-shaped.

9. The elevator system according to claim 1 wherein at least a portion of each of the grooves of at least one of the first deflecting element and the second deflecting element is complementary in shape to a shape of the ribs of the belt.

* * * * *